United States Patent
Lee et al.

(10) Patent No.: US 9,225,192 B2
(45) Date of Patent: Dec. 29, 2015

(54) APPARATUS AND METHOD OF CHARGING RECHARGEABLE BATTERY

(71) Applicant: Samsung Electronics Co., Ltd., Suwon-si, Gyeonggi-do (KR)

(72) Inventors: Dong-joon Lee, Yongin-si (KR); Dong-min Im, Seoul (KR); Victor Roev, Suwon-si (KR); Sang-bok Ma, Suwon-si (KR); Won-sung Choi, Yongin-si (KR); Min-sik Park, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 296 days.

(21) Appl. No.: 13/869,106

(22) Filed: Apr. 24, 2013

(65) Prior Publication Data
US 2014/0084849 A1  Mar. 27, 2014

(30) Foreign Application Priority Data
Sep. 26, 2012 (KR) .................. 10-2012-0107492

(51) Int. Cl.
*H02J 7/04* (2006.01)
*H02J 7/00* (2006.01)

(52) U.S. Cl.
CPC .............. *H02J 7/007* (2013.01); *H02J 7/008* (2013.01); *H02J 7/0093* (2013.01)

(58) Field of Classification Search
CPC ...... H02J 7/0093; H02J 7/007; H01M 10/052
USPC .................. 320/139, 107, 141, 145
See application file for complete search history.

(56) References Cited

U.S. PATENT DOCUMENTS

| | | | | |
|---|---|---|---|---|
| 4,829,225 | A | * | 5/1989 | Podrazhansky et al. ...... 320/129 |
| 5,481,174 | A | * | 1/1996 | Martin et al. ................. 320/129 |
| 5,646,505 | A | | 7/1997 | Melnikov et al. |
| 6,232,750 | B1 | * | 5/2001 | Podrazhansky et al. ...... 320/139 |
| 8,148,950 | B2 | | 4/2012 | Matsuura et al. |
| 2008/0048623 | A1 | | 2/2008 | Le Gall et al. |
| 2009/0066295 | A1 | | 3/2009 | Takeno |

FOREIGN PATENT DOCUMENTS

JP 2000-133320 A 5/2000

* cited by examiner

*Primary Examiner* — Edward Tso
*Assistant Examiner* — Aaron Piggush
(74) *Attorney, Agent, or Firm* — Cantor Colburn LLP (57) ABSTRACT

The apparatus of charging a rechargeable battery includes a voltage detector which detects a voltage value between terminals of a rechargeable battery, a current generator which generates current for charging the rechargeable battery and outputs the generated current to the terminals of the rechargeable battery, and a controller which controls the current generator based on the voltage value detected by the voltage detector. The current generator outputs a first current for which a direction thereof between the terminals of the rechargeable battery is constant, in a charging period of the rechargeable battery, wherein the first current comprises direct current, and a second current for which a direction thereof between the terminals of the rechargeable battery is periodically reversed, in an intermittent period of the rechargeable battery.

16 Claims, 7 Drawing Sheets

FIG. 1A (CHARGING)

FIG. 1B (DISCHARGING)

APPARATUS AND METHOD OF CHARGING RECHARGEABLE BATTERY

CROSS-REFERENCE TO RELATED APPLICATIONS

This application claims the benefit of Korean Patent Application No. 10-2012-0107492, filed on Sep. 26, 2012, in the Korean Intellectual Property Office, the disclosure of which is incorporated herein in its entirety by reference.

BACKGROUND

1. Field

Provided is an apparatus and method of charging a rechargeable battery.

2. Description of the Related Art

A lithium battery is light and has high energy density compared to other types of rechargeable batteries such as a nickel-cadmium battery, a nickel-hydrogen battery, a lead storage battery, etc. For this reason, the lithium battery is widely used in cellular phones, electric vehicles and so forth. However, to develop an electric vehicle having an energy range of a level equivalent to a combustion engine, the energy density of the lithium battery needs to be further improved. Thus, a search for further improving the energy density of the lithium battery has been conducted.

SUMMARY

Provided is an apparatus and method of charging a lithium battery while suppressing growth of a lithium dendrite in the lithium battery. A technical object to be achieved by the present invention is not limited to the foregoing technical object, and there may be other technical objects.

Provided is a charging apparatus including a voltage detector which detects a voltage value between terminals of a rechargeable battery, a current generator which generates current for charging the rechargeable battery and outputs the generated current to the terminals of the rechargeable battery, and a controller which controls the current generator based on the voltage value detected by the voltage detector. The current generator outputs a first current for which a direction thereof between the terminals of the rechargeable battery is constant, in a charging period of the rechargeable battery, where the first current includes direct current (DC), and a second current for which a direction thereof between the terminals of the rechargeable battery is periodically reversed, in an intermittent period of the rechargeable battery.

The second current may include alternating current (AC).

The first current may include the DC having a constant amplitude, and peaks of the second current during the intermittent period have a same amplitude as the constant amplitude of the DC.

The second current may include AC, and a voltage peak value of the alternating current increases in proportion to an increase of a voltage value of the DC having the constant amplitude.

The first voltage may include the DC having a constant voltage value, and voltage peaks of the second current in the intermittent period have a same voltage value as the constant voltage value.

The second current may include AC, and a current peak value of the alternating current decreases in proportion to a decrease of a current value of the DC having the constant voltage value.

A frequency of the AC may be determined according to a correspondence between characteristics of the AC and the frequency of the AC.

The charging apparatus may further include a temperature detector which detects a temperature of the rechargeable battery. At least one of a current's peak value, a voltage peak value and a frequency of the AC is adjusted according to the temperature value detected by the temperature detector.

The charging apparatus may further include a load connected to the rechargeable battery. The current generator may stop outputting the DC to cause the current to flow to the load from the rechargeable battery.

Provided is a charging method including outputting DC having a constant direction between terminals of a rechargeable battery, to the terminals in a first charging period; stopping outputting the DC, and outputting AC of which a direction thereof between the terminals of the rechargeable battery is periodically reversed, to the terminals in a first intermittent period; and stopping outputting the AC, and outputting the DC having the constant direction between the terminals of the rechargeable battery, to the terminals in a second charging period.

The direct current has a constant current amplitude, and in the outputting of the AC, the outputting the DC having the constant current amplitude is stopped, and current peaks in the first intermittent period have a same amplitude as the constant current amplitude of the DC.

The outputting the AC may include outputting AC having a voltage peak value which increases in proportion to an increase of a voltage value of the DC having the constant current amplitude.

The outputting of the DC may include outputting constant voltage to the terminals of the rechargeable battery, and the outputting the AC may include stopping outputting the constant voltage and voltage peaks in the first intermittent period have a same voltage value as the constant voltage.

The outputting of the AC may include outputting AC having a current peak value which decreases in proportion to a decrease of a current value of the constant voltage.

BRIEF DESCRIPTION OF THE DRAWINGS

The above and other features and advantages of the present invention will become more apparent by describing in detail embodiments thereof with reference to the attached drawings in which.

DETAILED DESCRIPTION

It will be understood that when an element or layer is referred to as being "connected to" or "coupled to" another element or layer, the element or layer can be directly connected or coupled to another element or layer or intervening elements or layers. In contrast, when an element is referred to as being "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In the search for further improving the energy density of the lithium battery, a cathode material of the lithium battery for improving the energy density of the lithium battery has been developed and lithium metal as the best cathode material has attracted attention. However, when lithium metal is used in the cathode of the lithium battery, a twig-like lithium dendrite is formed on the cathode of the lithium battery. The lithium dendrite gradually grows as charging/discharging is repeated and eventually reaches an anode, such that an internal electrical short circuit occurs in the lithium battery and thus the lithium battery may be undesirably ignited.

Hereinafter, embodiments of the present invention will be described in detail with reference to the accompanying drawings. In the following description, direct electrical current will be referred to simply as "DC" and alternating electrical current will be referred to simply as "AC".

Generally, a rechargeable battery is manufactured in the form of a pack in which a plurality of unit cells are connected in series or in parallel to provide power required by loads. In the following description both a pack including one unit cell and a pack in which a plurality of cells are connected will be referred to simply as rechargeable batteries.

Examples of rechargeable batteries may include, but are not limited to, a lithium battery, a nickel-cadmium battery, a nickel-hydrogen battery, a lead storage battery, and so forth. In the following description, the rechargeable battery may be described as a lithium battery as an example, but the embodiments of the present invention may also be applied to other types of rechargeable batteries as well as the lithium battery.

Figure 1A:
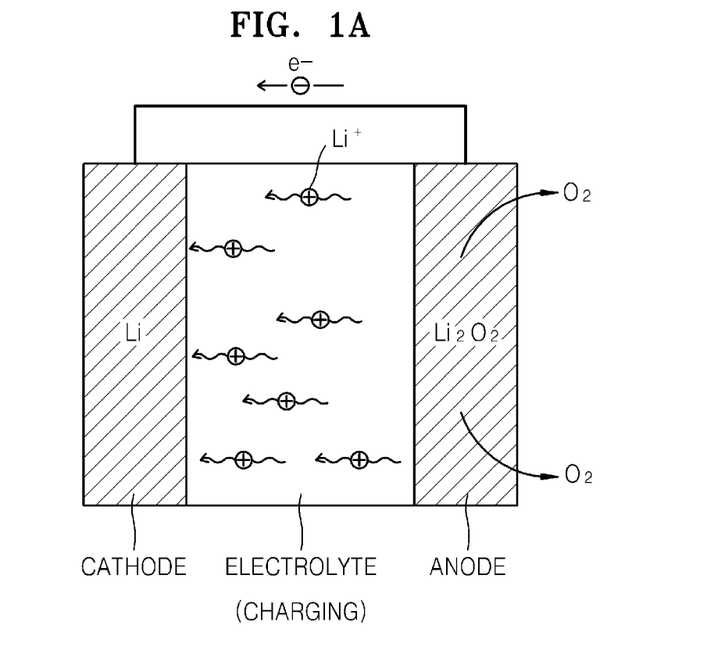
FIGS. 1A and 1B are diagrams showing the principle of charging and discharging a lithium-air battery.
Figure 1B:
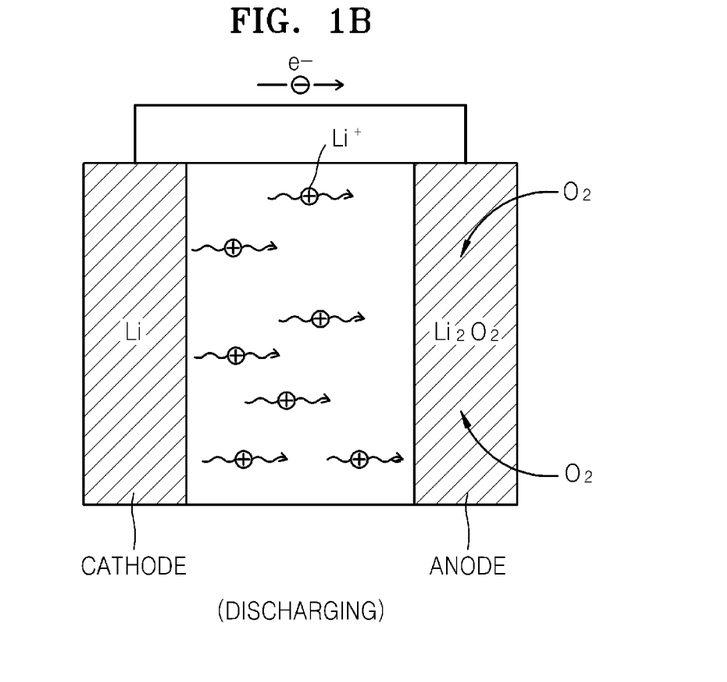

FIGS. 1A and 1B are diagrams showing the principle of charging and discharging a lithium-air battery. Representative lithium batteries may include a lithium-ion battery, a lithium-ion polymer battery, a lithium-air battery, etc. Most of the lithium batteries use lithium metal as a material for a cathode. In one embodiment, for example, a material for the cathode of the lithium-air battery is lithium metal.

Referring to FIGS. 1A and 1B, lithium ions ($Li^+$) in an electrolyte of a lithium battery move from an anode to a cathode during charging and move from the cathode to the anode during discharging. When the lithium ions are deposited in the cathode of the lithium battery due to charging of the lithium battery, the lithium ions are deposited on the surface of the cathode irregularly, rather than uniformly. As a result, a twig-like lithium dendrite is formed on the cathode of the lithium battery. Such a lithium dendrite gradually grows as charging and discharging is repeated, such that the lithium dendrite reaches the anode. Consequently, an internal electrical short circuit of the lithium battery occurs, and thus the lithium battery may be undesirably ignited.

The growth of the lithium dendrite may be suppressed by diffusion of the lithium ions in the electrolyte of the lithium battery. A direction of the lithium ions which move from the anode to the cathode during charging of the lithium battery is reversed during discharging of the lithium battery to cause the lithium ions to move from the cathode to the anode, and the moving direction of the lithium ions is reversed again during a subsequent charging of the lithium battery to cause the lithium ions to move back to the cathode from the anode, thus distributing the lithium ions in the electrolyte of the lithium battery. In particular, by repeating such an operation several times within a relatively short time, the lithium ions in the electrolyte of the lithium battery may be further scattered. The following description is made of a charging apparatus invented considering the foregoing points.

Figure 2:
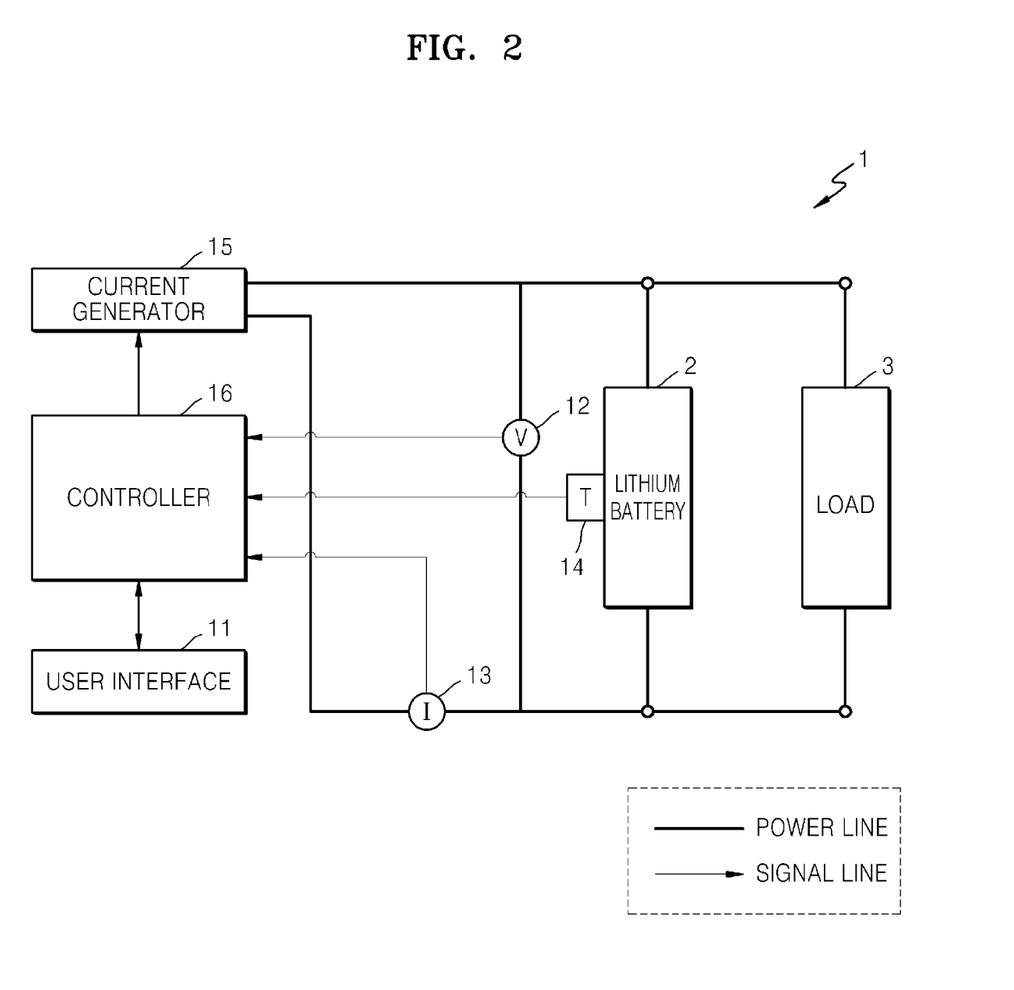
FIG. 2 is a structural diagram of an apparatus for charging a lithium battery according to an embodiment of the present invention.

FIG. 2 is a structural diagram of an apparatus 1 for charging a lithium battery 2 according to an embodiment of the present invention. Referring to FIG. 2, the apparatus 1 for charging the lithium battery 2 may include a user interface 11, a voltage detector 12, a current detector 13, a temperature detector 14, a current generator 15 and a controller 16. Hardware elements shown in FIG. 2 are merely examples. In one embodiment, for example, the apparatus 1 for charging the lithium battery 2 may be designed to not include a hardware element such as the user interface 11 and/or to further include a hardware element such as an alternating current-direct current ("AC/

DC") converter (not shown) for converting AC outputted from a power source to DC for driving the foregoing hardware elements.

The user interface 11 may display charging information of the lithium battery 2 indicated by a signal outputted from the controller 16 to a user and/or receive information necessary for charging the lithium battery 2 from a user. The voltage detector 12 detects a voltage between terminals of the lithium battery 2. The current detector 13 detects current which flows between the terminals of the lithium battery 2. The temperature detector 14 detects a temperature of the lithium battery 2. The current generator 15 generates current for charging the lithium battery 2 and outputs the generated current to terminals of the lithium battery 2. The controller 16 controls the current generator 15 based on the voltage detected by the voltage detector 12. The controller 16 may control the current generator 15 based on a current detected by the current detector 13 and/or a temperature detected by the temperature detector 14, as well as the voltage detected by the voltage detector 12.

Figure 3A:
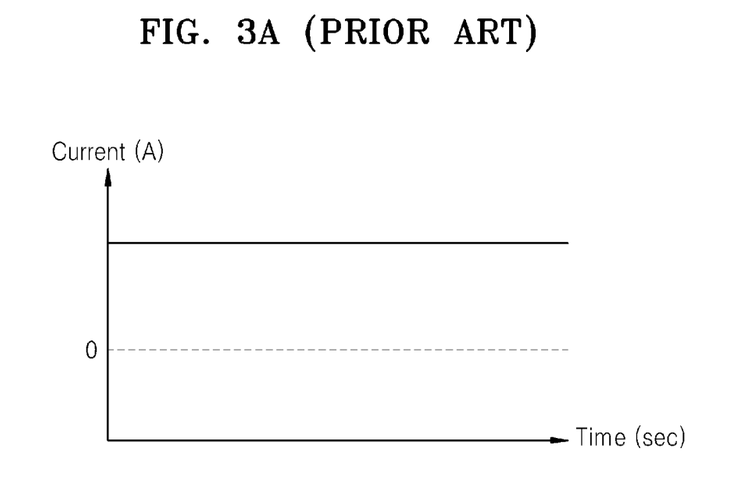
FIGS. 3A and 3B are diagrams showing waveforms of charging electrical current for a lithium battery.
Figure 3B:
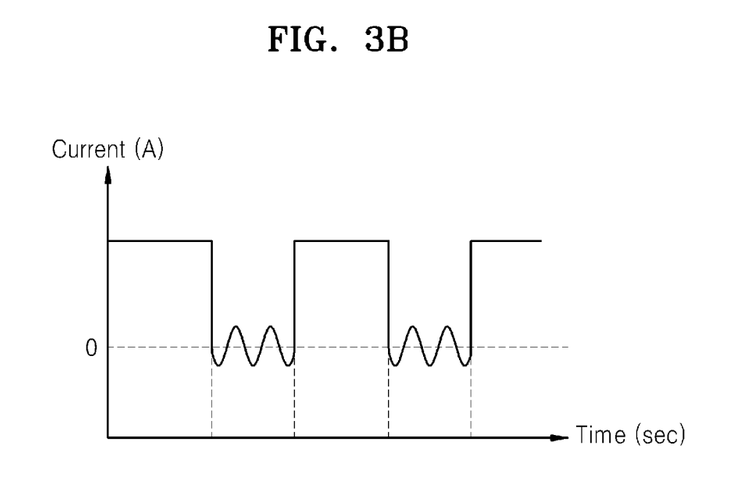

FIGS. 3A and 3B are diagrams showing waveforms of charging electrical current in amperes (A) with respect to time in seconds (sec) for a lithium battery 2. As shown in FIG. 3A, conventionally, the lithium battery 2 is charged by inputting, to terminals of the lithium battery 2, DC having a constant direction between the terminals, that is, DC which flows in a direction from a cathode to an anode of the lithium battery 2. As shown in FIG. 3B, to suppress the growth of the lithium dendrite of the lithium battery 2 while charging the lithium battery 2, the apparatus 1 shown in FIG. 2 charges the lithium battery 2 by inputting DC having a constant direction between the terminals of the lithium battery 2 to the terminals in a charging period and periodically reverses the DC direction between the terminals in intermittent time periods, during a total charging period of the lithium battery 2. If an intermittent time period in which the DC direction between the terminals of the lithium battery 2 is periodically reversed is relatively long, charging of the lithium battery 2 may be undesirably delayed, such that this intermittent time period may be designed to be much shorter or relatively small with respect to the charging period in which the DC is input to the terminals and/or the total charging period of the lithium battery 2.

When the current flows from the cathode to the anode of the lithium battery 2, the lithium battery 2 is charged. When the current flows from the anode to the cathode of the lithium battery 2, the lithium battery 2 is discharged. In FIG. 3B, in the intermittent time period in which the current direction between the terminals of the lithium battery 2 is periodically reversed, the current flow in charging of the lithium battery 2 and the current flow in discharging of the lithium battery 2 are periodically repeated. Such current flow may be realized by outputting DC to the terminals of the lithium battery 2 in the charging period and outputting AC to the terminals of the lithium battery 2 in the intermittent time period in which the direction of the current between the terminals is periodically reversed, through the current generator 15 under control of the controller 16. That is, the current generator 15 outputs the DC as a first current during the charging period and outputs the AC as a second current during the intermittent time period under control of the controller 16, such that the direction of the current between the terminals may be periodically reversed at intermittent times in the total charging period of the lithium battery 2. During these intermittent time periods in the total charging period, a waveform of the AC generated by the current generator 15 may be a sine wave as shown in FIG. 3B, or may be a triangular wave or a square wave. In one or more embodiments of the present invention, the first current and the second current may be alternately applied during the total charging period of the lithium battery 2, but the present invention is not limited thereto or thereby.

Charging of the lithium battery 2 is a process of storing electric energy from an external source in the lithium battery 2, whereas discharging of the lithium battery 2 is a process of releasing the electric energy stored in the lithium battery 2 to outside the lithium battery 2. Therefore, when the current generator 15 outputs AC to the lithium battery 2, charging of the lithium battery 2 and discharging of the lithium battery 2 are forcedly repeated relatively fast in the intermittent time period due to the direction of the AC outputted from the current generator 15. In FIG. 3B, in a current flowing time period corresponding to discharging of the lithium battery 2, that is, in a period in which a current value is less than 0, the electric energy stored in the lithium battery 2 is released to the outside thereof, to protect the apparatus 1, a device capable of consuming the released energy may be provided in the current generator 15 and/or in another hardware element of the apparatus. A representative example of the device is a resistor, not being limited thereto or thereby.

As shown in FIG. 2, a load 3 is connected to the lithium battery 2. The load 3 and the lithium battery 2 may be connected at all times, or may be selectively connected such as by a user. Where the load 3 and the lithium battery 2 are connected at all times, the lithium battery 2 and the apparatus 1 may be embedded in a certain device such as a cellular phone, an electric vehicle, etc. Where the load 3 and the lithium battery 2 are selective connected, the apparatus 1 may exist separately from a certain device. As mentioned previously, in the intermittent time period during which the direction of the current between the terminals of the lithium battery 2 is periodically reversed, the current flow in charging of the lithium battery 2 and the current flow in discharging of the lithium battery 2 are periodically repeated. Herein, the current flow in charging of the lithium battery 2 may be realized by causing the current to flow from the lithium battery 2 to the load 3.

To charge the lithium battery 2 by causing the current to flow from the lithium battery 2 to the load 3, the current generator 15 outputs the DC to the terminals of the lithium battery 2 under control of the controller 16 in the charging period and stops outputting the DC intermittently in the total charging period of the lithium battery 2 to cause the current to flow from the lithium battery 2 to the load 3. The outputting of the DC and the stopping of the outputting of the DC may be alternated within the total charging period of the lithium battery 2. If the amount of current flowing from the lithium battery 2 to the load 3 is not sufficient, the current generator 15 may output to the lithium battery 2, AC having a value corresponding to a difference between a target amount of current which needs to be released from the lithium battery 2 and the amount of current which actually flows from the lithium battery 2 to the load 3, under control of the controller 16. A current detector (not shown) may be additionally inserted to the power line which connects the lithium battery 2 with the load 3 to determine from a current value detected by the current detector whether the amount of current flowing from the lithium battery 2 to the load 3 is sufficient.

The current generator 15 may be implemented with a combination of a DC/DC converter and a DC/AC converter to generate charging current having a waveform in which DC and AC are combined. The controller 16 controls the DC/DC converter of the current generator 15 such that the current generator 15 generates DC suitable for charging the lithium battery 2, and controls the DC/AC converter of the current generator 15 such that the current generator 15 generates AC suitable for scattering lithium ions in an electrolyte of the lithium battery 2.

The controller 16 may be implemented with at least one of a read only memory ("ROM"s) having a charging program stored therein, a random access memory ("RAM") for temporarily storing data, a processor for executing the charging program stored in the ROM by using a data storage function of the RAM, and so forth. The controller 16 may further include an analog-to-digital ("A/D") converter for converting an analog signal into a digital signal if a signal outputted from the voltage detector 12, the current detector 13 and/or the temperature detector 14 is an analog signal. In one embodiment, the hardware elements of the apparatus 1 is implemented by one or more computer processing system including, but not limited to, a computer processor, logic and internal/external memory or storage. The computer processing system may further include any of a number of input and/or output devices such as a display panel, a graphical user interface, a computer processor monitor, etc.

A constant current-constant voltage charging scheme, a boost charging scheme, a constant power-constant voltage charging scheme, a multistage constant current-constant voltage charging scheme, etc., have been disclosed as quick charging schemes for lithium batteries. Embodiments described below use the constant current-constant voltage charging scheme which is most widely used among the quick charging schemes. However, other quick charging schemes may also be used. The constant current-constant voltage charging scheme may be briefly referred to as a CC-CV charging scheme.

Figure 4A:
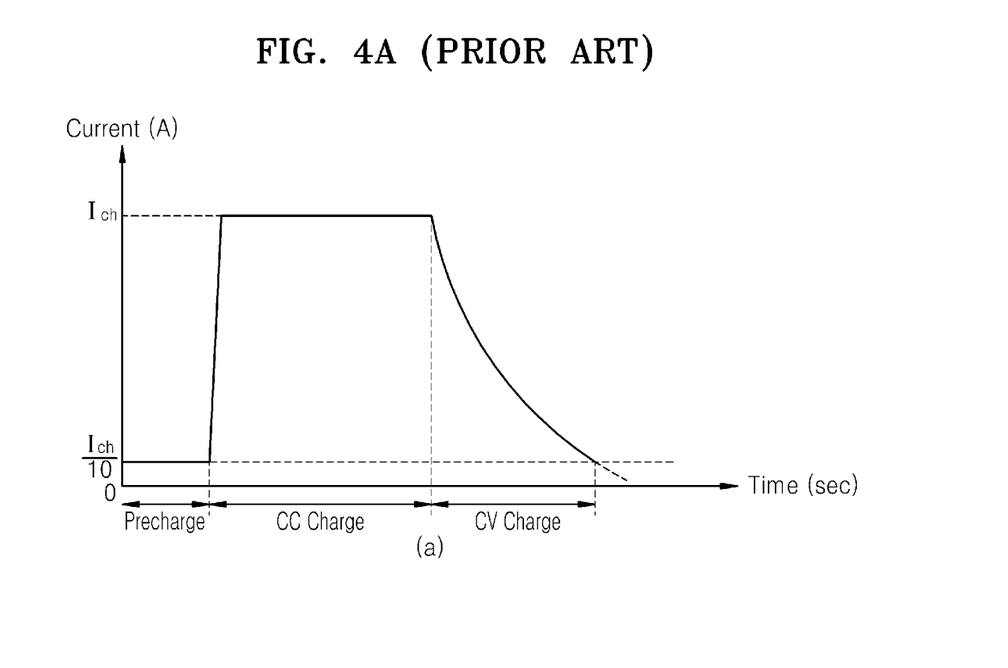
FIGS. 4A and 4B are diagrams showing waveforms of charging electrical current in a constant-current charging period of a lithium battery according to an embodiment of the present invention.
Figure 4B:
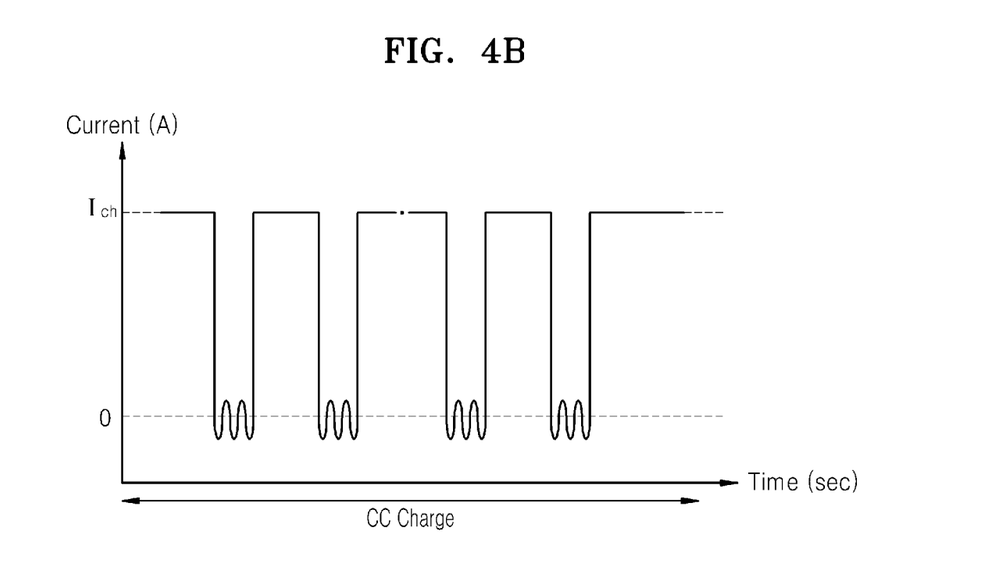

FIGS. 4A and 4B are diagrams showing waveforms of charging electrical current in amperes (A) with respect to time in seconds (sec) in a constant-current charging time period of the lithium battery 2 for a CC-CV charging scheme according to an embodiment of the present invention. As shown in FIG. 4A, conventionally, pre-charging ('Precharge' time period in FIG. 4A) is performed in which current having an amplitude of about 1/10 of a constant-current amplitude $I_{ch}$ is input to the terminals of the lithium battery 2. After completion of the pre-charging, a constant current charge ('CC Charge' time period in FIG. 4A) is performed in which constant current, which is DC having a constant amplitude of $I_{ch}$, is continuously input to the terminals of the lithium battery 2 until a voltage between the terminals of the lithium battery 2 reaches a predetermined voltage (point (a) in FIG. 4A), such as about 4.2 volts (V). After the constant current charge, the amplitude of the charging current decreases in a constant voltage charge time period ('CV Charge' in FIG. 4A) due to an increase of the voltage between the terminals of the lithium battery 2. When the amplitude of the charging current decreases to a predetermined threshold, e.g., about 1/10 of the constant current amplitude $I_{ch}$, then charging of the lithium battery 2 is terminated. The pre-charging is generally performed when the lithium battery 2 has been discharged to below about 2.9 V. The constant-current amplitude $I_{ch}$ is determined according to a capacity of the lithium battery 2.

As shown in FIG. 4B, to suppress the growth of the lithium dendrite of the lithium battery 2 while charging the lithium battery 2, the apparatus 1 shown in FIG. 2 charges the lithium battery 2 by inputting constant current, which is DC having a constant current amplitude $I_{ch}$, to the terminals of the lithium battery 2 in a charging period, and periodically reverses the direction of the current between the terminals in intermittent time periods, during a total charging period of the lithium battery 2. In an intermittent time period current peaks have the same amplitude as the constant current. Such a current flow may be achieved by outputting DC to the terminals of the lithium battery 2 in the charging period, and outputting AC to the terminals of the lithium battery 2 in the intermittent time period in which the direction of the current between the terminals is periodically reversed such that current peaks of the waveform during the intermittent time period have the same amplitude as the constant current, under control of the controller 16. That is, the current generator 15 outputs the DC as a first current during the charging period, and outputs the AC as a second current during the intermittent time period under control of the controller 16, such that the direction of the current between the terminals may be periodically reversed at intermittent times in the total charging period of the lithium battery 2.

Figure 5A:
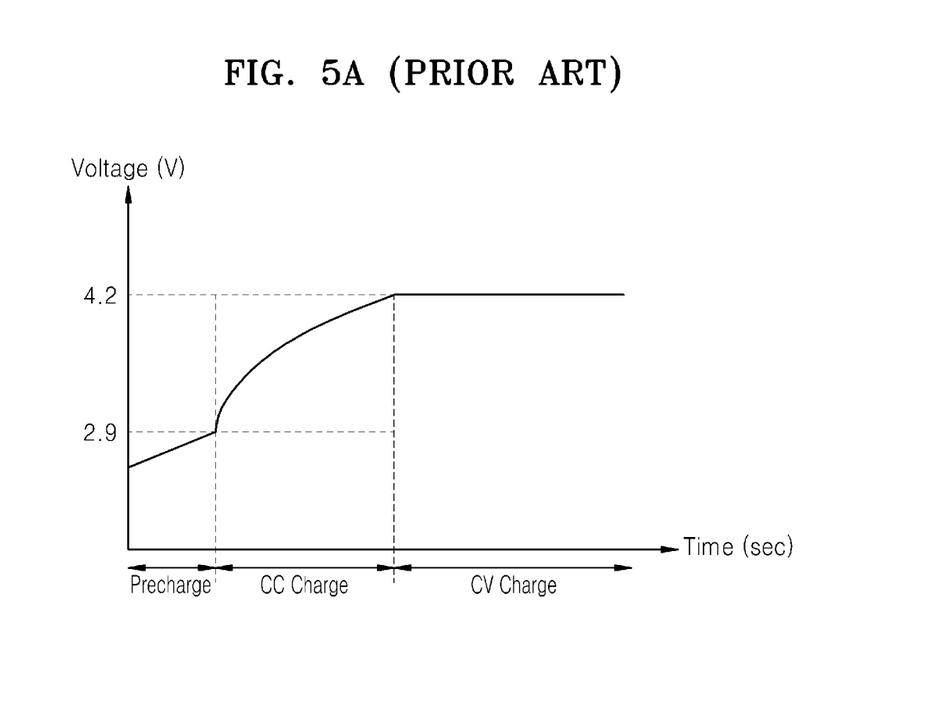
FIGS. 5A and 5B are diagrams showing waveforms of charging electrical current in a constant-voltage charging period of a lithium battery according to another embodiment of the present invention.
Figure 5B:
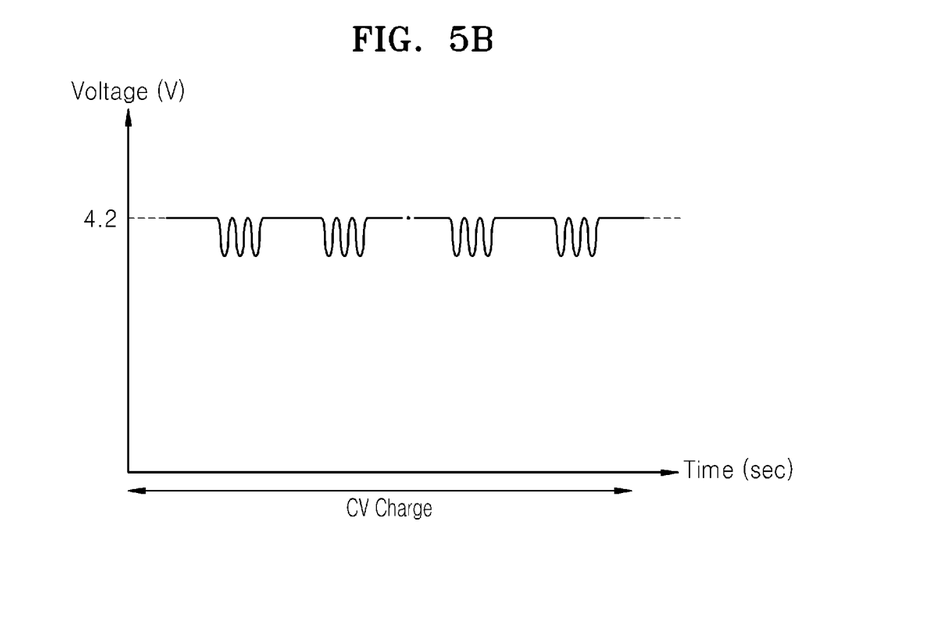

FIGS. 5A and 5B are diagrams showing waveforms of charging voltage in volts (V) with respect to time in seconds (sec) in a constant-voltage charging time period of the lithium battery 2 for the CC-CV charging scheme according to an embodiment of the present invention. As shown in FIG. 5A, conventionally, when a voltage between the terminals of the lithium battery 2 reaches a predetermined voltage such as 4.2 V during the constant current charge ('CC Charge' time period in FIG. 5A), charging with the constant current is terminated and a constant voltage which is DC having a constant value of 4.2 V is input to the terminals of the lithium battery 2 during the constant voltage charge ('CV Charge' time period in FIG. 5A). As shown in FIG. 4A, the amplitude of the charging current decreases by an increase of the voltage between the terminals of the lithium battery 2. When the amplitude of the charging current decreases to a predetermined threshold, e.g., about 1/10 of the constant current amplitude $I_{ch}$, then charging of the lithium battery 2 is terminated.

As shown in FIG. 5B, to suppress the growth of the lithium dendrite of the lithium battery 2 while charging the lithium battery 2, the apparatus 1 shown in FIG. 2 charges the lithium battery 2 by inputting a constant voltage, which is voltage having a constant voltage value of 4.2 V, to the terminals of the lithium battery 2 in a charging period, and periodically reverses the direction of the current between the terminals in intermittent time periods, during a total charging period of the lithium battery 2. In an intermittent time period, voltage peaks have the same voltage value as the constant voltage. Such a current flow may be achieved by outputting DC to the terminals of the lithium battery 2 under control of the controller 16 in the charging period, and outputting AC to the terminals of the lithium battery 2 in the intermittent time period in which the direction of the current between the terminals is periodically reversed such that voltage peaks of the waveform during the intermittent time period have the same voltage value as the constant voltage. That is, the current generator 15 outputs the DC as a first current during the charging period, and outputs the AC as a second current during the intermittent time period under control of the controller 16, such that the direction of the current between the terminals may be periodically reversed at intermittent times in the total charging period of the lithium battery 2.

As described above, by limiting the amplitude of AC in the constant-current charging period, input to the lithium battery 2 of overcurrent exceeding the amplitude of current defined in the CC-CV charging scheme is reduced or effectively prevented. As shown in FIG. 5A, during the constant-current charging period, the voltage value of the constant current gradually increases. Thus, the voltage peak value of the AC applied in the constant-current charging period may increase in proportion to an increase of the voltage value of the constant current inputted to the terminals of the lithium battery 2. This may be implemented by monitoring the voltage value detected by the voltage detector 12 and controlling the current generator 15 to generate AC having a voltage peak value, which increases in proportion to an increase of the voltage value detected by the voltage detector 12, based on a change of the monitored voltage value, at the controller 16.

In addition, by limiting a voltage value of AC in the constant-voltage charging period, input to the lithium battery 2 of overvoltage out of a defined voltage range is reduced or effectively prevented in the constant-voltage charging scheme. As shown in FIG. 4A, in the constant-voltage charging period, the current value of the constant voltage gradually decreases. Thus, the current peak value of the AC applied in the constant-voltage charging period may decrease in proportion to a decrease of the current value of the constant voltage inputted to the terminals of the lithium battery. This may be implemented by monitoring the current value detected by the current detector 13 and controlling the current generator 15 to generate AC having the current peak value, which decreases in proportion to a decrease of the current value detected by the current detector 13 based on a change of the monitored current value, at the controller 16.

As mentioned previously, to suppress the growth of the lithium dendrite of the lithium battery 2 while charging the lithium battery 2, in the apparatus 1 shown in FIG. 2, the current generator 15 outputs DC to the terminals of the lithium battery 2 under control of the controller 16 in a DC-charging period, and outputs AC to the terminals of the lithium battery 2 under control of the controller 16 in an AC-charging period in which the direction of the current between the terminals is periodically reversed, in a total charging period of the lithium battery 2. To further scatter the lithium ions in the electrolyte of the lithium battery 2, the lithium ions moving uniformly due to charging of the lithium battery 2 should be induced to irregularly move in the electrolyte. To induce the irregular movement of the lithium ions in the electrolyte of the lithium battery 2, it is desirable to increase the frequency of AC rather than the strength of the AC.

In the apparatus 1 shown in FIG. 2, AC having different characteristics according to a charging state of the lithium battery 2, rather than AC having constant characteristics, is input to the lithium battery 2. If the frequency of the AC is increased without considering such characteristics of the AC, the lithium battery 2 and the apparatus 1 may be damaged. In one embodiment, for example, if the frequency of the AC having a high current peak value or a high voltage peak value is high, the lithium battery 2 and the apparatus 1 may be overheated. To reduce or effectively prevent this phenomenon, the frequency of the AC inputted to the terminals of the lithium battery 2 may be determined according to a correspondence or relationship between the characteristics of the AC and the frequency of the AC. To implement this scheme, an optimal frequency for suppressing the growth of the lithium dendrite of the lithium battery 2 may be determined by experiment with respect to ACs having different characteristics, and data indicating a correspondence between the characteristics of AC and the frequency of the AC may be generated. The controller 16 may determine the frequency of AC from a voltage value detected by the voltage detector 12 and a current value detected by the current detector 13 by referring to the data indicating the correspondence between the characteristics of the AC and the frequency of the AC, and control the current generator 15 to generate AC having the determined frequency.

When the lithium battery 2 is over-discharged or over-charged, the lithium battery 2 may be damaged. Where the lithium battery 2 is over-discharged or over-charged, the temperature of the lithium battery 2 may undesirably increase. AC first inputted to the terminals of the lithium battery 2 after a time at which charging of the lithium battery 2 starts causes discharging of the lithium battery 2, such that over-discharging of the lithium battery 2 may occur. To avoid over-discharging or over-charging of the lithium battery 2, the controller 16 may adjust at least one of a current peak value, a voltage peak value and/or a frequency of AC inputted to the terminals of the lithium battery 2 according to a temperature value of the lithium battery 2 detected by the temperature detector 14, and may control the current generator 15 to generate the AC having the adjusted current value, voltage peak value and/or frequency.

As previously stated, FIGS. 4A and 5A show the conventional CC-CV charging scheme, and FIGS. 4B and 5B show a charging scheme according to an embodiment of the present invention for suppressing the growth of the lithium dendrite of the lithium battery 2 while charging the lithium battery 2. In the charging scheme shown in FIGS. 4B and 5B, an AC charging period in which AC is input to the lithium battery 2 may not contribute to the overall charging of the lithium battery 2. To complete charging of the lithium battery 2 more quickly while suppressing the growth of the lithium dendrite of the lithium battery 2, the conventional CC-CV charging scheme shown in FIGS. 4A and 5A and the charging scheme shown in FIGS. 4B and 5B may be used together. In one embodiment, for example, the controller 16 controls the current generator 15 to charge the lithium battery 2 according to the conventional CC-CV charging scheme shown in FIGS. 4A and 5A, thus completing charging of the lithium battery 2, and also controls the current generator 15 to charge the lithium battery 2 according to the charging scheme shown in FIGS. 4B and 5B in charging of the lithium battery 2 after discharging of the lithium battery 2, thus completing the total charging of the lithium battery 2. Whether to use the charging scheme shown in FIGS. 4B and 5B after using the conventional CC-CV charging scheme shown in FIGS. 4A and 5A may be determined based on a user designated value which is input through the user interface 11 or experimental data considering aging of the lithium battery 2.

Figure 6:
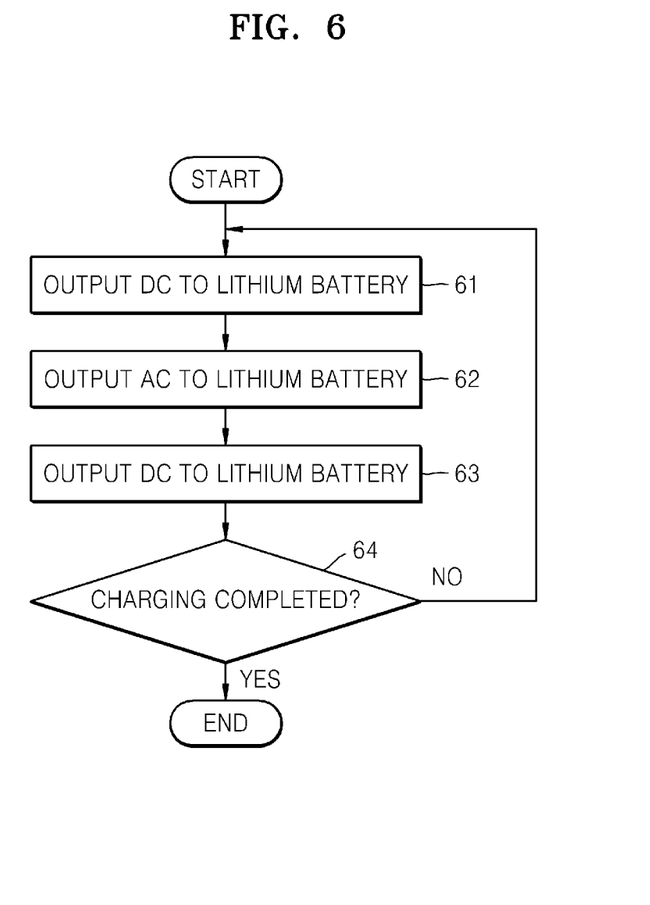
FIG. 6 is a flowchart of a method of charging a lithium battery according to an embodiment of the present invention.

FIG. 6 is a flowchart of a method of charging the lithium battery 2 according to an embodiment of the present invention. Referring to FIG. 6, the method includes operations processed in time series in the apparatus 1 shown in FIG. 2. Thus, the foregoing description of the apparatus 1 shown in FIG. 2, although being omitted in the following description, is also applied to the method of charging the lithium battery 2 described below.

In operation 61, the apparatus 1 for charging the lithium battery 2 outputs DC having a constant current direction between the terminals of the lithium battery 2 to the terminals of the lithium battery 2, based on a voltage value between the terminals. As described above, a voltage value and a current value of the DC outputted to the terminals of the lithium battery 2 are determined according to the voltage value between the terminals of the lithium battery 2, together with the current value between the terminals of the lithium battery 2 or a temperature value of the lithium battery 2.

In operation 62, for an intermittent time period, the apparatus 1 for charging the lithium battery 2 stops outputting DC to the terminals of the lithium battery 2 and outputs to the terminals of the lithium battery 2, AC in which the direction of the current between the terminals is periodically reversed. As mentioned previously, a voltage peak value, a current peak value and/or a frequency of the AC outputted to the terminals of the lithium battery 2 may be predefined. The voltage peak value, the current peak value and/or the frequency of the AC outputted to the terminals of the lithium battery 2 may be alternatively or additionally determined considering the voltage value and the current value between the terminals of the lithium battery 2 and the temperature value of the lithium battery 2.

In operation 63, the apparatus 1 stops outputting the AC to the terminals of the lithium battery 2 and outputs the DC again to the terminals of the lithium battery 2 based on the voltage value between the terminals of the lithium battery 2.

In operation 64, the apparatus 1 determines whether charging of the lithium battery 2 is completed based on the voltage value between the terminals of the lithium battery 2 and the current value of the charging current inputted to the terminals of the lithium battery 2. If charging of the lithium battery 2 is completed, charging of the lithium battery 2 is terminated. Otherwise, unless charging of the lithium battery 2 is completed, the process returns to operation 61.

The scattering effect of the lithium ions in the electrolyte of the lithium battery 2 may be achieved by a relatively small intermittent time period in which the AC is applied, such that a delay in the total charging of the lithium battery 2 is reduced or effectively prevented. A duration of the AC charging period in operation 62 may be relatively small or shorter than a duration of the DC charging period in operations 61 and 63. In one embodiment, for example, the duration of the AC charging period in operation 62 may be set to about ⅒ of the duration of the DC charging period in operations 61 and 63.

Operation 64 may or may not be performed only after operation 63, and may also be performed anytime during charging of the lithium battery 2. In one embodiment, for example, if the detected voltage value of the lithium battery 2 exceeds a predetermined threshold, e.g., 4.2 V, at any time point during charging of the lithium battery 2, charging of the lithium battery 2 may be immediately stopped. This may occur mainly when charging of the lithium battery 2 is not normally achieved such as due to a cell balancing problem in the lithium battery 2.

Figure 7:
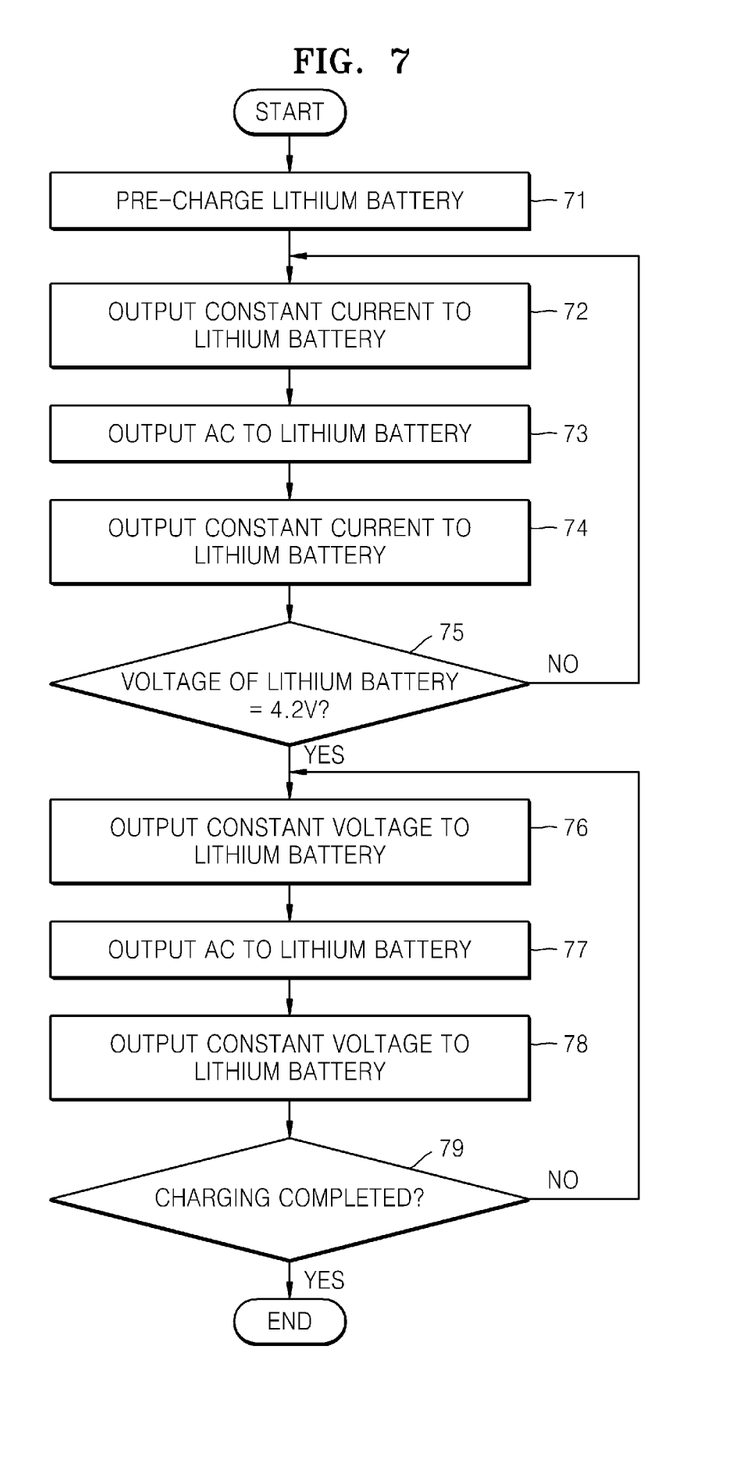
FIG. 7 is a flowchart of a constant current-constant voltage ("CC-CV") charging method in which the method shown in FIG. 6 is applied.

FIG. 7 is a flowchart of a CC-CV charging method to which the method shown in FIG. 6 is applied. Referring to FIG. 7, the CC-CV charging method according to an embodiment of the present invention includes operations processed in time series in the apparatus 1 shown in FIG. 2. Thus, the foregoing description of the apparatus 1 shown in FIG. 2, although being omitted in the following description, is also applied to the new CC-CV charging method described below.

In operation 71, the apparatus 1 pre-charges the lithium battery 2. Operation 71 may not be performed if a voltage value between the terminals of the lithium battery 2 is higher than a predetermined or minimum value, such as 2.9 V.

In operation 72, the apparatus 1 outputs constant current, which is DC having a constant current amplitude $I_{ch}$, to the terminals of the lithium battery 2 based on the voltage value between the terminals of the lithium battery 2. In operation 73, the apparatus 1 stops outputting the constant current to the terminals of the lithium battery 2 and outputs to the terminals of the lithium battery 2 during an intermittent time period, AC in which the direction of the current between the terminals is periodically reversed such that current peaks of the waveform have the same amplitude as the constant current. The apparatus 1 may also output AC having a voltage peak value which increases in proportion to an increase of the voltage value of the constant current inputted to the terminals of the lithium battery 2 in operation 72. In operation 74, the apparatus 1 stops outputting the AC to the terminals of the lithium battery 2 and outputs again constant current to the terminals of the lithium battery 2 based on the voltage value between the terminals of the lithium battery 2.

In operation 75, the apparatus 1 goes to operation 76 if the voltage value between the terminals of the lithium battery 2 reaches a predetermined value such as 4.2 V, Otherwise, the apparatus 1 goes back to operation 72. Operations 72 through 74 correspond to constant-current charging, and operations 76 through 78 to be described below correspond to constant-voltage charging.

In operation 76, the apparatus 1 outputs a constant voltage, which is DC having a constant voltage value of 4.2 V, to the terminals of the lithium battery 2 based on the voltage value between the terminals of the lithium battery 2. In operation 77, the apparatus 1 stops outputting the constant voltage to the terminals of the lithium battery 2 and outputs to the terminals of the lithium battery 2 during an intermittent time period, AC in which the direction of the current between the terminals is periodically reversed such that voltage peaks of the waveform have the same voltage value as the constant voltage. The apparatus 1 may also output AC having a current peak value which decreases in proportion to a decrease of the current value of the constant voltage inputted to the terminals of the lithium battery in operation 72. In operation 78, the apparatus 1 stops outputting the AC to the terminals of the lithium battery 2 and outputs the constant voltage again to the terminals of the lithium battery 2 based on the voltage value between the terminals of the lithium battery 2.

In operation 79, the apparatus 1 determines whether charging of the lithium battery 2 is completed based on the current value of the charging current inputted to the terminals of the lithium battery 2. In one embodiment, for example, in operation 79, if the current value of the charging current inputted to the terminals of the lithium battery 2 decreases to about ⅒ of the constant-current amplitude $I_{ch}$ in the constant-current charging period, then the apparatus 1 determines that charging of the lithium battery 2 is completed. Upon completion of charging of the lithium battery 2, charging of the lithium battery 2 is terminated. Otherwise, the apparatus 1 goes back to operation 76.

According to one or more of the foregoing embodiments of the present invention, a lithium battery may be charged while suppressing the growth of the lithium dendrite on the cathode of the lithium battery. In particular, one or more of the foregoing embodiments may be applied to a conventional quick charging scheme, e.g., a CC-CV charging scheme, such that the lithium battery may be charged relatively quickly while suppressing the growth of the lithium dendrite on the cathode of the lithium battery. During repeated charging and discharging of the lithium battery, growth of the lithium dendrite is suppressed, and an electrical short circuit in the lithium battery caused by the growth of the lithium dendrite may be removed or delayed. As a result, a time for commercialization of the lithium battery in which lithium metal is used as the cathode material may be accelerated. Moreover, when one or more of the foregoing embodiments is applied to the lithium battery in which graphite or the like, except for lithium metal, is used as the cathode material, an effect similar to the aforementioned effect may be provided.

While the present invention has been particularly shown and described with reference to embodiments thereof, it will be understood by one of ordinary skill in the art that various changes in form and detail may be made therein without departing from the spirit and scope of the present invention as defined by the following claims. Accordingly, the disclosed embodiments should be considered in a descriptive sense and not in a restrictive sense. The scope of the present invention will be defined by the appended claims, and differences in scope equivalent to the appended claims should be construed as being included in the present invention.

What is claimed is:

1. A charging apparatus comprising:
a voltage detector which detects a voltage value between terminals of a rechargeable battery;
a current generator which generates currents for charging the rechargeable battery and outputs the generated currents to the terminals of the rechargeable battery; and
a controller which controls the current generator based on the voltage value detected by the voltage detector,
wherein the current generator outputs
a first current for which a direction thereof between the terminals of the rechargeable battery is constant, in a charging period of the rechargeable battery, wherein the first current comprises direct current, and
a second current for which a direction thereof between the terminals of the rechargeable battery is periodically reversed without a discharge pulse, in an intermittent period of the rechargeable battery.

2. The charging apparatus of claim 1, wherein the second current comprises alternating current.

3. The charging apparatus of claim 1, wherein
the first current comprises the direct current having a constant amplitude, and
peaks of the second current during the intermittent period have a same amplitude as the constant amplitude of the direct current.

4. The charging apparatus of claim 3, wherein the second current comprises alternating current, and a voltage peak value of the alternating current increases in proportion to an increase of a voltage value of the direct current having the constant amplitude.

5. The charging apparatus of claim 1, wherein
a first voltage has a constant voltage value, and
voltage peaks of a second voltage in the intermittent period have a same voltage value as the constant voltage value.

6. The charging apparatus of claim 5, wherein
the second current comprises alternating current, and
a current peak value of the alternating current decreases in proportion to a decrease of a current value of the direct current having the constant voltage value.

7. The charging apparatus of claim 2, wherein a frequency of the alternating current is determined according to a charging state of the rechargeable battery.

8. The charging apparatus of claim 2, further comprising:
a temperature detector which detects a temperature of the rechargeable battery,
wherein at least one of a current peak value, a voltage peak value and a frequency of the alternating current is adjusted according to the temperature of the rechargeable battery detected by the temperature detector.

9. The charging apparatus of claim 1, further comprising a load connected to the rechargeable battery,
wherein the current generator stops outputting the direct current in the intermittent period such that current flows to the load from the rechargeable battery.

10. The charging apparatus of claim 1, wherein the current generator alternately outputs the first and second currents in a total charging period of the rechargeable battery.

11. A charging method comprising:
outputting direct current having a constant direction between terminals of a rechargeable battery, to the terminals in a first charging period;
stopping outputting the direct current, and outputting alternating current of which a direction thereof between the terminals of the rechargeable battery is periodically reversed without a discharge pulse, to the terminals in a first intermittent period; and
stopping outputting the alternating current, and outputting the direct current having the constant direction between the terminals of the rechargeable battery, to the terminals in a second charging period.

12. The charging method of claim 11, wherein
the direct current has a constant current amplitude, and
in the outputting of the alternating current, the outputting the direct current having the constant current amplitude is stopped, and current peaks in the first intermittent period have a same amplitude as the constant current amplitude of the direct current.

13. The charging method of claim 12, wherein the outputting the alternating current comprises outputting alternating current having a voltage peak value which increases in proportion to an increase of a voltage value of the direct current having the constant current amplitude.

14. The charging method of claim 11, wherein
the outputting the direct current comprises outputting constant voltage to the terminals of the rechargeable battery, and
in the outputting the alternating current, the outputting the constant voltage is stopped, and voltage peaks in the intermittent period have a same voltage value as the constant voltage.

15. The charging method of claim 14, wherein the outputting the alternative current comprises outputting alternating current having a current peak value which decreases in proportion to a decrease of a current value of the constant voltage.

16. The charging method of claim 12, further comprising:
outputting constant voltage to the terminals of the rechargeable battery, in a third charging period after the second charging period;
stopping outputting the constant voltage, and outputting the alternating current of which the direction thereof between the terminals of the rechargeable battery is periodically reversed, to the terminals; and
stopping outputting the alternating current, and outputting the constant voltage between the terminals of the rechargeable battery, to the terminals in a fourth charging period.

* * * * *